(12) United States Patent  (10) Patent No.: US 8,779,972 B2
Kimura et al.  (45) Date of Patent: Jul. 15, 2014

(54) INFORMATION PROCESSING TERMINAL AND COMPUTER PROGRAM

(75) Inventors: Hiromichi Kimura, Saitama (JP); Taro Kurita, Tokyo (JP); Mitsugi Iwahashi, Kanagawa (JP)

(73) Assignee: Felica Networks, Inc., Tokyo (JP)

( * ) Notice: Subject to any disclaimer, the term of this patent is extended or adjusted under 35 U.S.C. 154(b) by 108 days.

(21) Appl. No.: 12/004,341

(22) Filed: Dec. 20, 2007

(65) Prior Publication Data

US 2008/0174480 A1    Jul. 24, 2008

(30) Foreign Application Priority Data

Dec. 25, 2006  (JP) ................................. 2006-348305

(51) Int. Cl.
  *G01S 19/14*  (2010.01)
(52) U.S. Cl.
  USPC .................................................... 342/357.52
(58) Field of Classification Search
  USPC ............. 342/357.06, 357.13, 357.17, 357.52; 235/380, 382, 382.5
  See application file for complete search history.

(56) References Cited

U.S. PATENT DOCUMENTS

| | | | | |
|---|---|---|---|---|
| 4,839,506 A | * | 6/1989 | Homma et al. | 235/379 |
| 5,640,139 A | * | 6/1997 | Egeberg | 340/426.19 |
| 5,640,452 A | * | 6/1997 | Murphy | 380/258 |
| 5,749,549 A | * | 5/1998 | Ashjaee | 248/168 |
| 6,020,845 A | * | 2/2000 | Weinberg et al. | 342/354 |
| 6,028,937 A | * | 2/2000 | Tatebayashi et al. | 713/169 |
| 6,299,934 B1 | * | 10/2001 | Manning | 427/137 |
| 6,508,400 B1 | * | 1/2003 | Ishifuji et al. | 235/382 |
| 6,729,550 B2 | * | 5/2004 | Seita et al. | 235/492 |
| 6,747,598 B2 | * | 6/2004 | Bajikar | 342/357.17 |
| 7,096,366 B1 | * | 8/2006 | Watanabe | 713/182 |
| 7,212,097 B2 | * | 5/2007 | Yoshikawa | 340/5.28 |
| 7,219,833 B2 | * | 5/2007 | Cantini et al. | 235/379 |
| 7,523,507 B2 | * | 4/2009 | Leinonen et al. | 726/32 |
| 7,848,765 B2 | * | 12/2010 | Phillips et al. | 455/456.3 |
| 2004/0250037 A1 | * | 12/2004 | Takemura et al. | 711/164 |

FOREIGN PATENT DOCUMENTS

| | | |
|---|---|---|
| JP | 2001 320473 | 11/2001 |
| JP | 2002-352205 | 12/2002 |
| JP | 2003-076958 | 3/2003 |
| JP | 2003-91704 | 3/2003 |
| JP | 2003-242428 | 8/2003 |
| JP | 2006 20295 | 1/2006 |
| JP | 2006-114959 | 4/2006 |
| JP | 2006-236376 | 9/2006 |
| JP | 2006 262113 | 9/2006 |

\* cited by examiner

*Primary Examiner* — Cassie Galt
(74) *Attorney, Agent, or Firm* — Frommer Lawrence & Haug LLP; William S. Frommer

(57) ABSTRACT

An information processing terminal, including a request reception unit that receives a function request. A GPS signals reception unit that receives a GPS signal, and a current position measuring unit that determines the latitude and longitude of the current position of the information processing terminal based upon the GPS signal. A defining information recording unit in which defining information related to the functions that can be engaged at the information processing terminal is recorded. A function decision-making unit that makes a decision as to whether or not a function can be engaged based upon the defining information and the latitude and longitude of the current position having been measured by the current position measuring unit and a data read/write unit that reads/writes data from/into a data area among a plurality of data areas based upon the results of the decision made by the function decision-making unit.

4 Claims, 5 Drawing Sheets

| SYSTEM DEFINING INFORMATION | | |
|---|---|---|
| FUNCTION INFORMATION 8BYTES | • ZONE FLAG | ON /OFF |
| | • SECURITY ON FLAG | ON /OFF |
| | • READ OK FLAG | ON /OFF |
| | • PRIORITY RANKINGS | |
| ZONE INFORMATION 8 BYTES | • ORIGIN POINT INFORMATION | 4 BYTES |
| | • DISTANCE INFORMATION | 4 BYTES |

THE FUNCTIONS/SERVICES PROVIDED BY THE SYSTEM ARE DYNAMICALLY SWITCHED IN THE INDIVIDUAL AREAS A, B AND C.

INFORMATION PROCESSING TERMINAL AND COMPUTER PROGRAM

CROSS REFERENCE TO RELATED APPLICATION

The present invention contains subject matter related to Japanese Patent Application JP 2006-348305 filed in the Japan Patent Office on Dec. 25, 2006, the entire contents of which being incorporated herein by reference.

BACKGROUND OF THE INVENTION

1. Field of the Invention

The present invention relates to an information processing terminal and a computer program.

2. Description of the Related Art

Information processing terminals such as portable telephones and cards, with installed IC chips having recorded therein information, are widely used in noncontact wireless communication carried out with reader/writer (R/W) terminals. In particular, such information processing terminals with IC chips installed therein are commonly utilized for check-in processing at access points to boarding areas in public transportation systems, for payment processing at retail cashiers, for credit card bill settlement processing, for employee time-clock recording and the like.

The processing described above can be executed through wireless communication by referencing information stored in a data area set for information storage within an IC chip. A plurality of data areas, instead of a single data area, can be set in the IC chip and since a given data area cannot be accessed from another data area, a plurality of functions can be fulfilled in a single IC chip by creating a plurality of data areas in the IC chip (see patent reference literatures 1 through 3).
(Patent reference literature 1) Japanese Laid Open Patent Publication No. 2001-320473
(Patent reference literature 2) Japanese Laid Open Patent Publication No. 2006-20295
(Patent reference literature 3) Japanese Laid Open Patent Publication No. 2006-262113

SUMMARY OF THE INVENTION

The valid functions in an IC chip having a plurality of data areas, installed in an information processing terminal in the related art, are fixed at the time of manufacture. Namely, since IC chips are normally tamper-proofed so as to assure a high level of resistance to tampering from the outside and thus assure a high level of security, it is extremely difficult to modify their functions once the IC chips have been shipped. A function valid in an IC chip can be modified only by accessing the parameter area within the IC chip where parameters are managed and adjusting the parameters in response to instructions issued from an outside device. This gives rise to a concern that since the parameter area must be accessed for parameter adjustment whenever the IC chip functions are to be modified, the modification cost will be significant.

Accordingly, the present invention addresses the concern discussed above by providing a new and improved information processing terminal equipped with a built-in IC chip and a new and improved computer program executed to engage in operation a computer equipped with an IC chip, which allows the functions of the IC chip to be switched without altering data within the IC chip by determining the current position based upon a radio signals received from GPS satellites and automatically selecting a function to be engaged in correspondence to the position thus determined.

According to an embodiment of the present invention, there is provided an information processing terminal with a built-in IC chip having a plurality of data areas present therein, which engages in wireless data exchange with another device through noncontact communication. The information processing terminal comprises a request reception unit that receives a function request issued to the information processing terminal from the other device, GPS signals reception unit that receives GPS signals originating from GPS satellites, a current position measuring unit that measures the latitude and longitude of the current position of the information processing terminal based upon the GPS signals received by the GPS signal reception unit, a defining information recording unit in which defining information, defining functions that can be engaged at the information processing terminal, is recorded, a function decision-making unit that makes a decision as to whether or not a function can be engaged based upon the defining information and the latitude and the longitude of the current position measured by the current position measuring unit and a data read/write unit that executes data read/write from/into a specific data area among the plurality of data areas based upon results of the decision made by the function decision-making unit.

The information processing terminal described above is equipped with a built-in IC chip having a plurality of data areas present therein, which enables wireless data exchange with another device through noncontact communication. The request reception unit receives a function request issued to the information processing terminal from the other device, the GPS signal reception unit receives GPS signals originating from GPS satellites, the current position measuring unit measures the latitude and longitude of the current position of the information processing terminal based upon the GPS signals received by the GPS signal reception unit, the function decision-making unit makes a decision as to whether or not a given function can be engaged based upon the defining information recorded in the defining information recording unit and the latitude and the longitude of the current position measured by the current position measuring unit and the data read/write unit executes data read/write from/into a specific data area among the plurality of data areas based upon the results of the decision made by the function decision-making unit. Thus, a function to be engaged can be automatically selected simply by determining the current position based upon the radio signals received from the GPS satellites and automatically switching over to the function to be engaged in correspondence to the determined current position, without having to perform a task of altering the parameters inside the IC chip.

The information processing terminal may further comprise a function selection unit that selects a specific function among a plurality of functions in response to the function request. This function selection unit selects a given function among the plurality of functions based upon the function request issued by the other device. As a result, the function decision-making unit is able to make a decision as to whether or not the function having been selected by the function selection unit can be engaged.

The defining information recording unit, at least, may be included in the IC chip. By installing the defining information recording unit in the IC chip, it can be ensured that the information recorded in the defining information recording unit is not leaked to the outside or tampered with by an outsider.

In the defining information recording unit, function information indicating functions valid in the IC chip and zone information indicating function engagement ranges may be recorded and, in such a case, the function decision-making unit may determine a function to be engaged by referencing the function information and the zone information.

The function information may include information indicating priority levels, and if a plurality of zones defined by the zone information overlap, the function decision-making unit may determine the function to be engaged based upon the priority levels.

The information processing terminal may be a portable telephone. By installing the IC chip described above in a portable telephone, the current position of the portable telephone can be determined based upon the radio signals received from the GPS satellites and the function to be engaged can be automatically selected in correspondence to the determined current position.

According to another embodiment of the present invention, there is provided a computer program enabling a computer equipped with a built-in IC chip having a plurality of data areas present therein, which engages in wireless data exchange through noncontact communication, to execute a request reception step in which a function request originating from an outside device is received, GPS signals reception step in which GPS signals from GPS satellites are received, a current position measuring step in which the latitude and longitude of the current position are measured based upon the GPS signals received in the GPS signal reception step, a function decision-making step in which a decision is made as to whether or not a function can be engaged based upon defining information that defines functions that can be engaged and the latitude and longitude of the current position measured in the current position measuring step and a data read/write step in which data read/write from/into a given data area among the plurality of data areas is executed based upon results of the decision made in the function decision-making step.

In the method described above, a function request is received from an outside device in the request reception step, GPS signals are received from GPS satellites in the GPS signal reception step. In the current position measuring step, the latitude and longitude of the current position are measured based upon the GPS signals received in the GPS signal reception step, in the function decision-making step, a decision is made as to whether or not a function can be engaged based upon the defining information related to functions that can be engaged and the latitude and longitude of the current position measured in the current position measuring step, and in the data read/write step, data read/write from/into a specific data area among the plurality of data areas is executed based upon the results of the decision made in the function decision-making step. Thus, a function to be engaged can be automatically selected simply by determining the current position based upon the radio signals received from the GPS satellites and automatically switching over to the function to be engaged in correspondence to the determined current position, without having to perform a task of altering the parameters inside the IC chip.

According to the embodiments of the present invention described above, a new and improved information processing terminal with a built-in IC chip and a new and improved computer program executed to engage a computer with a built-in IC chip in operation, which allow functions to be switched without altering the data in the IC chip by determining the current position based upon GPS signals transmitted via radio signals and automatically selecting a function to be engaged in correspondence to the current position thus determined.

DETAILED DESCRIPTION OF THE PREFERRED EMBODIMENTS

Figure 1:
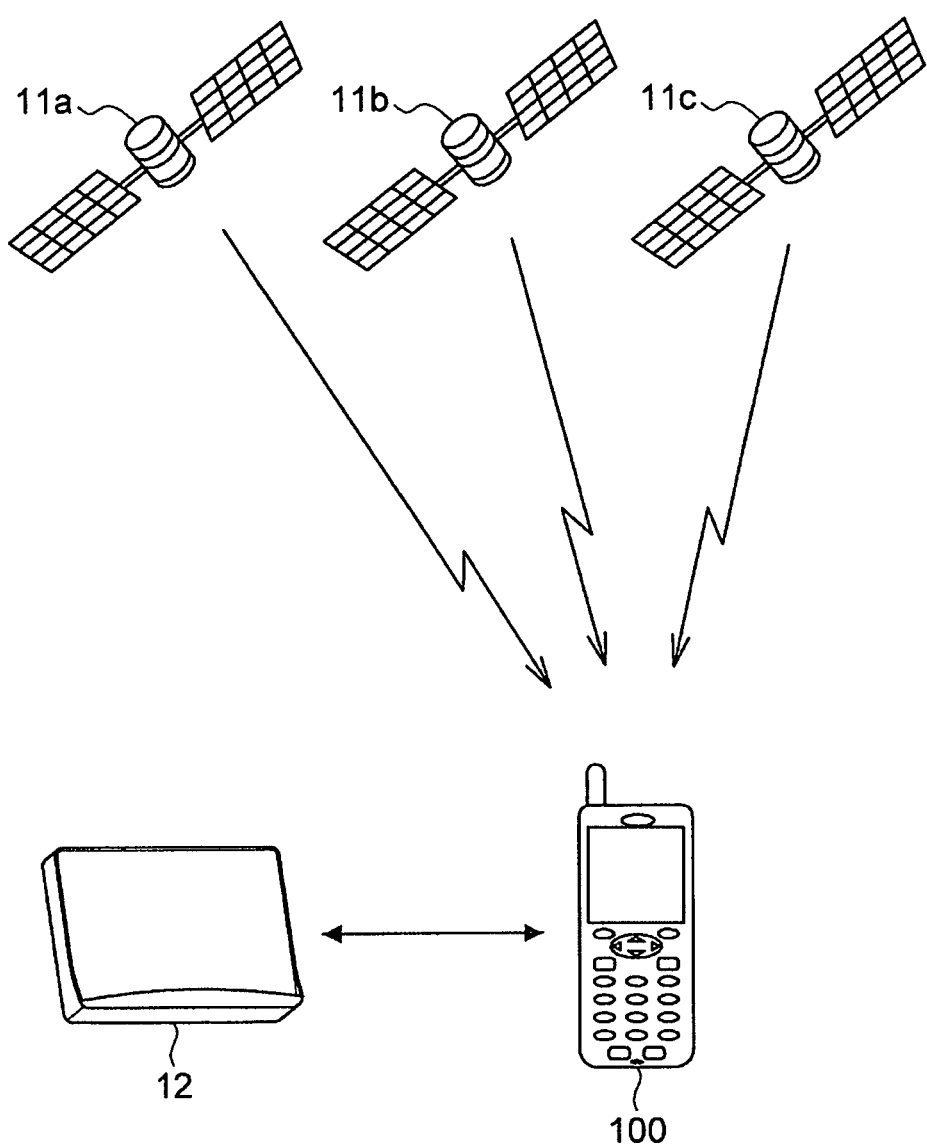
FIG. 1 illustrates a noncontact data transmission/reception system that includes the information communication terminal 100 achieved in a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

FIG. 1 schematically illustrates a noncontact data transmission/reception system achieved in conjunction with an information processing terminal 100 in the first embodiment of the present invention. The noncontact data transmission/reception system achieved in conjunction with the information processing terminal 100 in the first embodiment of the present invention is now summarized in reference to FIG. 1.

Although not shown in FIG. 1, the information processing terminal 100 includes a built-in IC chip capable of wirelessly transmitting/receiving data through radio signals with a specific frequency and thus, data can be wirelessly exchanged via radio signals with the specific frequency between an IC reader/writer 12 and the IC chip built into the information processing terminal 100. In the IC chip built into the information processing terminal 100, a plurality of data areas used for information storage are present, and wireless data exchange is executed by referencing as necessary the information stored in the data areas.

The information processing terminal 100 is a compact communication device such as a portable telephone or a PDA (personal digital assistant). By building an IC chip, capable of noncontact wireless communication and having a plurality of data areas present therein, into such a compact communication device, the functions of the compact communication device itself and the functions of the IC chip can be utilized in coordination.

The flow of data wirelessly exchanged between the IC reader/writer 12 and the information processing terminal 100 is as follows.

The IC reader/writer 12 outputs a radio signal at the specific frequency. As the information processing terminal 100 moves into the vicinity of the IC reader/writer 12, the IC chip built into the information processing terminal 100 receives the radio signal. The built-in IC chip at the information processing terminal 100 includes a coil disposed therein, and as the radio signal at the specific frequency passes through the coil, electromagnetic induction occurs, thereby starting IC chip operation. Then, the built-in IC chip at the information processing terminal 100 transmits to the IC reader/writer 12 a response to an instruction having been carried to the information processing terminal on the radio signal from the IC reader/writer 12. Upon receiving the response from the built-in IC chip at the information processing terminal 100, the IC reader/writer 12 transmits a radio signal with the specific frequency again if the communication with the IC chip needs to continue and the IC chip receives this radio signal.

Until the sequence of information transmission/reception executed as described above is completed, the IC reader/writer 12 and the built-in IC chip at the information processing terminal 100 engage in wireless data transmission/reception and, as a result, data are wirelessly exchanged through noncontact communication between the IC reader/writer 12 and the information processing terminal 100.

In addition, although not shown in FIG. 1, the information processing terminal 100 includes GPS signals reception unit that receives a GPS (global positioning system) signal. Based upon GPS signals received at the GPS signal reception unit from GPS satellites 11*a*, 11*b* and 11*c*, the latitude and longitude of the current position of the information processing terminal 100 can be ascertained.

In the first embodiment, the latitude and longitude of the current position of the information processing terminal 100 are measured based upon the GPS signals received from the GPS satellites 11*a*, 11*b* and 11*c*, and the functions of the built-in IC chip at the information processing terminal 100 are switched, activated/deactivated or the like based upon the latitude/longitude information so as to automatically select a function to be engaged at the information processing terminal 100. The following is a detailed explanation of the structure and operation of the information processing terminal 100.

It is to be noted that the functions of the IC chip include those related to data read/write (a function enabling both read and write, a function enabling read alone, etc.) and functions related to attendant processing executed at the time of data read/write (e.g., a function mandating authentication or a function enabling read/write of specific information only). In addition, different versions of a given function may each be separately allocated to a specific data area in the IC chip.

The noncontact data transmission/reception system achieved in conjunction with the information processing terminal 100 in the first embodiment of the present invention has been briefly explained in reference to FIG. 1. Next, the structure adopted in the information processing terminal 100 in the first embodiment of the present invention is explained.

Figure 2:
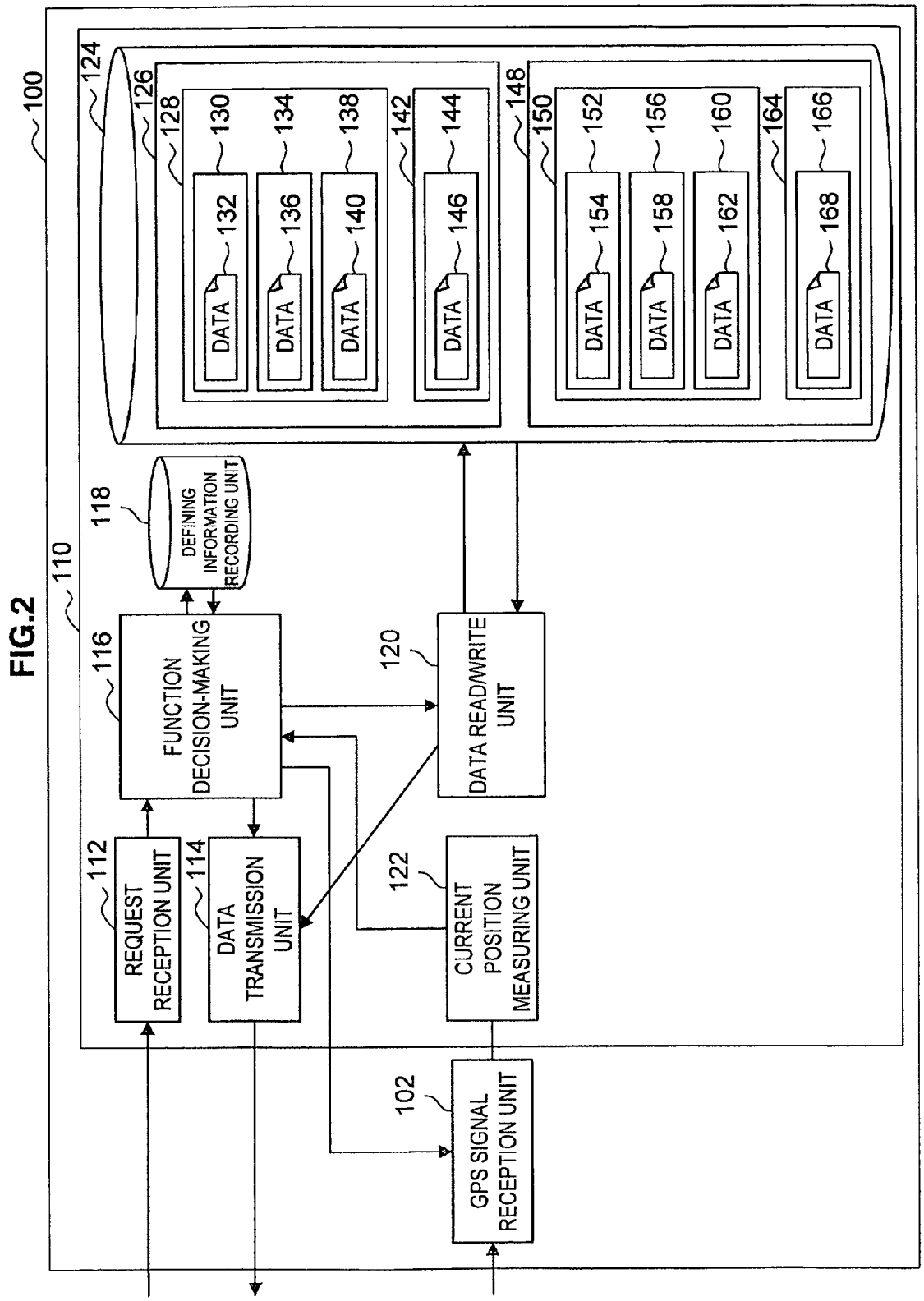
FIG. 2 shows the structure adopted in the information processing terminal 100 in the first embodiment of the present invention.

FIG. 2 illustrates the structure of the information processing terminal 100 achieved in the first embodiment of the present invention. The following is a detailed explanation of the structure adopted in the information processing terminal 100 in the first embodiment of the present invention, given in reference to FIG. 2.

As shown in FIG. 2, the information processing terminal 100 achieved in this embodiment of the present invention includes GPS signals reception unit 102 and an IC chip 110.

The IC chip 110 is utilized to store data, execute arithmetic processing and exchange data through noncontact communication with an outside device. It is desirable that the IC chip 110 be tamper-proofed so as to prevent information indicating the operation executed in the IC chip or the processing procedure from becoming leaked to an outsider and also present any information from becoming tampered with by a third party. The IC chip 110 achieved in the first embodiment of the present invention includes a request reception unit 112, a data transmission unit 114, a function decision-making unit 116, a defining information recording unit 118, a data read/write unit 120, a current position measuring unit 122 and a data storage unit 124. The following is a detailed explanation of the internal structure of the IC chip 110.

The request reception unit 112 wirelessly receives data intended for the IC chip 110 originating from an outside device. The request reception unit 112 in this embodiment receives a function request signal having been transmitted from the IC reader/writer 12 via radio with a specific frequency. Once the function request having been carried on the radio signal with the specific frequency from the IC reader/writer 12, is received at the request reception unit 112, the IC chip 110 is able to respond to the function request issued from the outside device.

The data transmission unit 114 wirelessly transmits data to an outside recipient. The data transmission unit in this embodiment transmits data read out by the data read/write unit 120 to the IC reader/writer 12. As the data transmission unit 114 transmits the data to the IC reader/writer 12, noncontact data exchange between the information processing terminal 100 equipped with the built-in IC chip 110 and the IC reader/writer 12 is enabled.

It is desirable that the request reception unit 112 and the data transmission unit 114 each include, for instance, an antenna coil so as to ensure that radio signals with the specific frequency are received. As a radio signal with the specific frequency passes through such an antenna coil, an electromotive force is induced through electromagnetic induction, and the IC chip 110 is engaged in operation by this electromotive force. In addition, when a response is to be transmitted to the IC reader/writer 12, a radio signal with the specific frequency is generated as an electrical current is supplied to the antenna coil. As this radio signal is received at the IC reader/writer 12, data can be transmitted from the IC chip 110 to the IC reader/writer 12.

The function decision-making unit 116 makes a decision pertaining to the functions of the IC chip 110. In the decision-making pertaining to the functions of the IC chip 110, a decision is made as to whether or not a function having been requested by the outside device can be engaged at the current position of the information processing terminal 100. The function decision-making unit 116 takes in the request signal for the IC chip 110, having been received at the request reception unit 112, and executes processing for making a decision as to whether or not the function requested in the request signal can be engaged at the current position of the information processing terminal 100. The function decision-making processing executed at the information processing terminal 100 is to be described in detail later.

The defining information recording unit 118 contains recorded therein defining information used in the decision-making processing executed by the function decision-making unit 116. The function decision-making unit 116 executes the decision-making processing by using the defining information recorded in the defining information recording unit 118. The defining information recorded in the defining information recording unit 118 in this embodiment includes function information and zone information. The function information relates to the functions set in the data storage unit 124 in the IC chip 110, whereas the zone information indicates the engagement ranges over which the functions set in the data storage unit 124 in the IC chip 110 can be engaged. The function information and the zone information are in correspondence to each other. The contents of the defining information recorded in the defining information recording unit 118 are to be described in detail later.

The defining information recording unit 118 is included in the IC chip 110 in this embodiment. The defining information recording unit 118 according to the present invention may instead be installed at a location other than within the IC chip 110 at the information processing terminal 100. However, the information recorded in the defining information recording unit 118 relates to the functions of the information processing terminal 100 and, for this reason, the defining information recording unit should be installed at a location where the information therein cannot be altered readily. Accordingly, it is desirable to install the defining information recording unit 118 in the tamper-proofed IC chip 110, which does not allow alteration of the information from the outside.

The data read/write unit 120 executes data read/write processing to read/write data from/into the data storage unit 124. The data read/write unit 120 in this embodiment reads/writes data from/into the data storage unit 124 based upon the function request signal having originated from the IC reader/writer 120 and having been received at the request reception unit 112. When reading/writing data from/into the data storage unit 124, the data read/write unit 120 selects a specific data area where the data read/write processing is to be executed among a plurality of data areas in the data storage unit 124. The data read/write processing executed by the data read/write unit 120 is to be described in detail later.

The current position measuring unit 122 measures the current position based upon a GPS signal. The current position measuring unit 122 in this embodiment takes in GPS signals having been received at the GPS signal reception unit 102 and measures the current position based upon the GPS signal. It is to be noted that while the current position measuring unit 122 is installed in the IC chip 110 in this embodiment, the present invention is not limited to this example and the current position measuring unit may be installed at a location other than in the IC chip 110 at the information processing terminal 100.

In the data storage unit 124, data related to the functions valid at the information processing terminal 100 are stored. The data storage unit 124 includes a plurality of data areas 126 and 148. Each data area corresponds to a given function, and the data area to be used for read/write is selected based upon the function request originating from the outside device.

The data area 126 includes data storage areas 128 and 142, and the data area 148 includes data storage areas 150 and 164. The data storage area 128, in turn, is constituted with data storage areas 130, 134 and 138, in which the data 132, data 136 and data 140 are respectively stored. In addition, the data storage area 142 is constituted with a data storage area 144 in which data 146 are stored. Likewise, the data storage area 150 is constituted with data storage areas 152, 156 and 160, in which data 154, data 158 and data 162 are respectively stored. In addition, the data storage area 164 is constituted with a data storage area 166 in which data 168 are stored.

Each of the data areas 126 and 148 cannot be accessed from the other data area. Namely, when the function assigned to the data area 126 is engaged, the data area 148 cannot be accessed and when the function assigned to the data area 148 is engaged, the data area 126 cannot be accessed in this embodiment.

As described above, the data storage unit 124 includes a plurality of data areas each assuming a hierarchical internal structure. It will be obvious that while the data storage unit 124 in this embodiment includes two data areas, the quantity of data areas and the internal structure adopted in the data areas are not limited to those shown in the example presented in FIG. 2. The data storage unit 124 may be designed to assume any hierarchical structure.

The data storage unit 124 should be constituted with a storage element capable of electrical data read/write, such as an EPROM (erasable programmable read-only memory) or a FeRAM (ferroelectric random access memory).

The GPS signal reception unit 102 receives GPS signals from the GPS satellites 11*a*, 11*b* and 11*c*. Based upon the GPS signals from the GPS satellites 11*a*, 11*b* and 11*c* received at the GPS signal reception unit 102, the current position can be measured. In this embodiment, the GPS signal reception unit 102 receives GPS signals in response to GPS signals reception request issued from the function decision-making unit 116 and the GPS signal thus received at the GPS signal reception unit 102 is transmitted to the current position measuring unit 122.

The function decision-making processing method adopted in the information processing terminal 100 achieved in the first embodiment of the present invention structured as explained above in reference to FIG. 2 is now described.

Figure 3:
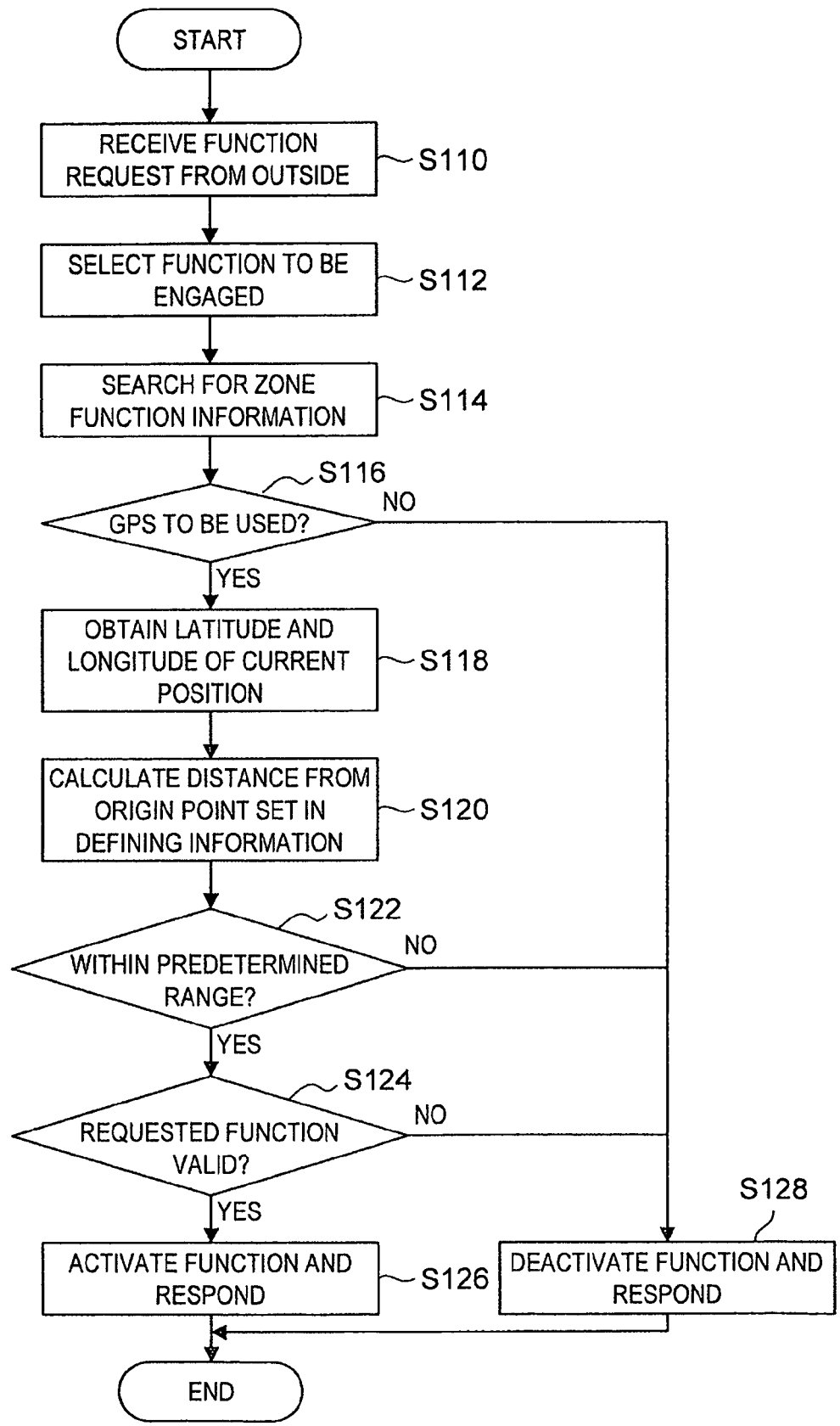
FIG. 3 presents a flowchart of the function decision-making processing executed in the information processing terminal 100 in the first embodiment of the present invention.

FIG. 3 presents a flowchart of the function decision-making processing executed at the information processing terminal 100 in the first embodiment of the present invention. The following is an explanation of the function decision-making processing executed at the information processing terminal 100 in the first embodiment of the present invention given in reference to FIG. 3.

First, a function request signal carried via radio with the specific frequency from an outside device is received at the information processing terminal 100 in order to start the operation of the IC chip 110 (step S110). In this embodiment, as the information processing terminal 100 with the built-in IC chip 110 moves within a specific range from the IC reader/writer 12, the function request signal via radio transmitted from the IC reader/writer 12 with the specific frequency is received at the request reception unit 112.

Upon receiving the function request, the function to be engaged is selected in correspondence to the received function request (step S112). The function decision-making unit 116 selects the function in this step in this embodiment. Once the function to be engaged is selected by the function decision-making unit 116, zone function information corresponding to the selected functions is searched in order to determine whether or not the selected function can be engaged at the current position assumed by the information processing terminal 100 (step S114).

The zone function information is searched by utilizing the GPS. Accordingly, a decision is first made as to whether or not the GPS is to be utilized (step S116). If it is decided in step S116 that the GPS is to be utilized, the current position is measured by utilizing the GPS. In this embodiment, the function decision-making unit 116 issues GPS signals reception request to the GPS signal reception unit 102.

Upon receiving the GPS signal reception request from the function decision-making unit 116, the GPS signal reception unit 102 receives a GPS signals from GPS satellites 11*a*, 11*b* and 11*c* and the GPS signals thus received at the GPS signal reception unit 102 is transmitted to the current position measuring unit 122. The current position measuring unit 122, having obtained the GPS signals, calculates the latitude and longitude of the information processing terminal based upon the GPS signals. The latitude and longitude thus calculated are provided to the function decision-making unit 116 from the current position measuring unit 122 and, as the information indicating the latitude and longitude is received by the function decision-making unit 116 from the current position measuring unit 122, the latitude and longitude of the current position of the information processing terminal 100 are ascertained (step S118).

Upon ascertaining the latitude and longitude of the current position of the information processing terminal 100, the function decision-making unit 116 calculates the distance between the current position of the information processing terminal 100 indicated by the latitude and longitude and an origin point in the defining information recording unit 118 (step S120). The latitude and longitude of the origin point to be used as a reference point in conjunction with each engagement range are recorded as the zone information in the defining information recording unit 118 in this embodiment and, accordingly, the distance between the two points can be calculated based upon the latitude and longitude of the origin point and the latitude and longitude of the current position of the information processing terminal 100.

Then, the function decision-making unit 116 makes a decision as to whether or not the distance having been calculated in step S120 is equal to or less than a distance indicated in distance information stored in the defining information recording unit 118 (step S122).

If the distance calculated in step S120 is determined to be equal to or less than the distance indicated in the distance information in the defining information recording unit 118, the function decision-making unit 116 makes a further decision as to whether or not the function having been requested by the outside device is valid (step S124).

Figures 4, 5:
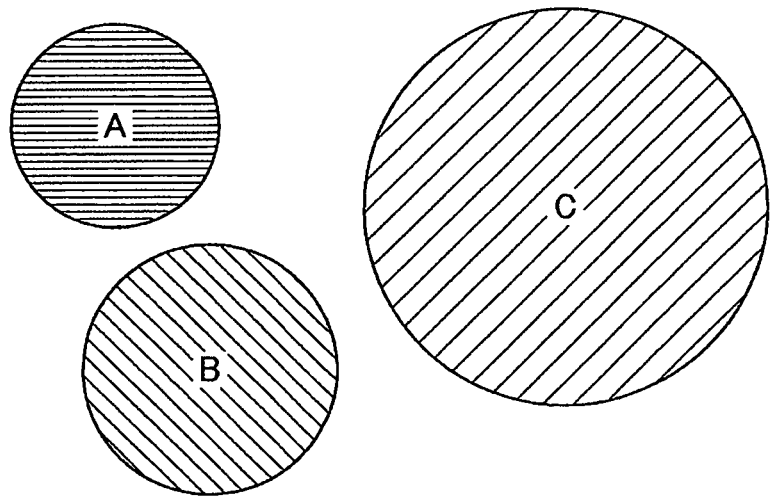
FIG. 4 presents an example of system-defining information that may be utilized in the first embodiment of the present invention.
FIG. 5 illustrates the relationship between the zones and the functions, which may be established in the first embodiment of the present invention.

FIG. 4 illustrates an example of the defining information recorded in the defining information recording unit 118 in the first embodiment of the present invention, and FIG. 5 shows the relationship between the zones and the functions set forth in the first embodiment of the present invention.

As shown in FIG. 4, the function information and the zone information are recorded as the defining information. The function information relates to the functions of the IC chip 110, whereas the zone information indicates the engagement ranges over which the individual functions can be engaged. The function information in this embodiment includes a zone flag, a security ON flag, a read OK flag and priority rankings, whereas the zone information in this embodiment includes the origin point information and the distance information.

The zone flag in the function information is used to indicate whether the requested function is valid or invalid when the information processing terminal 100 is located at a point within the range defined by the zone information. The security ON flag is used to indicate whether or not the requested function assures secure communication with the IC reader/writer. The write ON flag indicates whether or not the requested function enables a valid data write into the data storage unit 124. The priority ranking information indicates a specific function to be given priority when ranges defined in the zone information overlap.

The origin point information included in the zone information indicates the latitude and longitude of the center of a circle representing the range over which the requested function is valid, whereas the distance information in the zone information indicates the distance matching the radius measured from the center of the circle representing the range over which the function is valid. For instance, if a given function is to remain valid over a 100 km radius around Tokyo Station, the latitude and longitude of Tokyo Station should be set as the origin point information and 100 km should be set as the distance information.

As shown in FIG. 4, the function information and the zone information constituting the defining information are each recorded as 8-byte data in the defining information recording unit 118. The function decision-making unit 116 makes the decision with regard to the function requested by the IC reader/writer 12 by referencing the defining information recorded in the format described above in the defining information recording unit 118. It will be obvious that the contents of the defining information recorded in the defining information recording unit and the data volumes of the function information and the zone information are not limited to those in the example presented in FIG. 4.

FIG. 5 shows that three functions A, B and C are valid at the information processing terminal 100 with the built-in IC chip 110 with the three circles each indicating the range over which the corresponding function can be engaged. If the function A is requested in the function request from the IC reader/writer 12 and the current position of the information processing terminal 100, measured by the current position measuring unit 122 based upon GPS signals received at the GPS signal reception unit 102 in response to GPS signals reception request from the function decision-making unit 116, is determined to be inside the circle A by referencing the zone information, the function A can be engaged at the current position.

However, the defining information recorded in the defining information recording unit 118 may be set so as to deactivate the requested function and send a response to the IC reader/writer 12 accordingly. Namely, if the current position of the information processing terminal 100 having been measured is determined to be inside the circle corresponding to the requested function by referencing the zone information, the function can be deactivated and a response may be transmitted to the IC reader/writer 12 accordingly.

For instance, the defining information may be set so that in response to a function request for a given function from the IC reader/writer 12, the requested function is engaged if the information processing terminal 100 is located within a circle with a specific radius around Tokyo Station but the requested function is deactivated if the information processing terminal 100 is located within the circle with the specific radius around Osaka Station.

In addition, some circles may overlap, depending upon the settings indicated in the zone information. Under such circumstances, the priority information included in the function information may be referenced to determine the function to be given priority.

If the function decision-making unit 116 determines in step S124 that the function having been requested by the outside device is valid, the function requested by the outside device is activated and a response is transmitted (step S126). In this embodiment, if the function decision-making unit 116 determines that the function having been requested by the outside device is valid, a message indicating that the requested function is valid is wirelessly transmitted via the data transmission unit 114 to the IC reader/writer 12. Once the message indicating that the requested function is valid is transmitted from the IC chip 110 to the IC reader/writer 12, noncontact wireless data transmission/reception is executed between the IC reader/writer 12 and the IC chip 110.

If, on the other hand, it is decided in step S116 that the GPS is not to be utilized, if it is decided in step S122 that the calculated distance exceeds the distance indicated in the distance information stored in the defining information recording unit 118 or if it is decided in step S124 that the requested function is not valid, the function requested by the outside device is deactivated and a response is transmitted accordingly (step S128). No noncontact wireless data communication is executed by the IC reader/writer 12 and the information processing terminal 100 in this embodiment once the function decision making unit 116 judges that function requested by the outside device is not valid and the message indicating that the requested function is invalid is wirelessly transmitted to the IC reader/writer 12 via the data transmission unit 114.

It is to be noted that when deactivating the function requested by the outside device and transmitting a response in step S128, the response data may be transferred from the function decision-making unit 116 to the data transmission unit 114 via the data read/write unit 120 or the response data may be directly transferred to the data transmission unit 114 from the function decision-making unit 116.

The function decision-making processing executed at the information processing terminal 100 in the first embodiment of the present invention has been explained in reference to FIG. 3.

It is to be noted that the processing executed as described above may be executed by sequentially calling up computer programs stored in the information processing terminal 100.

In the first embodiment of the present invention described above, at the information processing terminal 100 with the built-in IC chip having a plurality of data areas set therein to enable the information processing terminal to assume a plurality of functions, the current position of the information processing terminal 100 is determined by utilizing the GPS. As a result, the functions of the information processing terminal 100 can be dynamically switched without having to modify the settings in the IC chip 110. By setting fine details in the zone information recorded in the defining information recording unit 118, different services can be provided to the user of the information processing terminal 100 depending upon the zone in which the information processing terminal is currently located.

In addition, the function settings can be adjusted without having to alter or modify the settings in the IC chip 110, which substantially eliminates the cost that would otherwise be incurred when the settings were altered or modified in the IC chip 110. Since the settings do not need to be altered or modified, better convenience for the user of the information processing terminal 100 is assured.

Second Embodiment

The IC chip may adopt an internal structure other than that shown in FIG. 2. In reference to the second embodiment, another structural example that may be adopted in the IC chip is explained.

Figure 6:
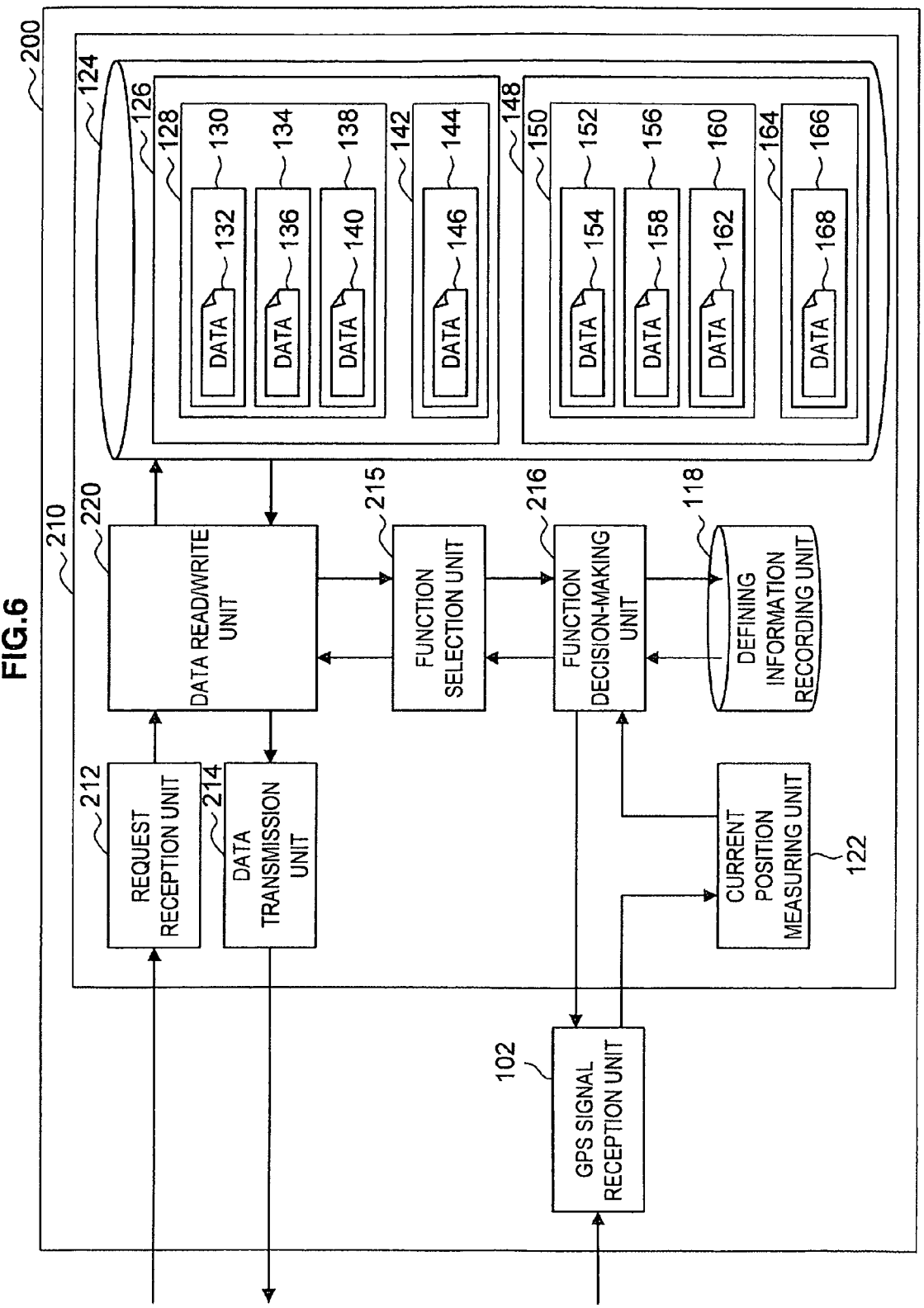
FIG. 6 shows the structure adopted in the information processing terminal 200 in a second embodiment of the present invention.

FIG. 6 illustrates the structure of an information processing terminal 200 achieved in the second embodiment of the present invention. The following is a detailed explanation of the structure adopted in the information processing terminal 200 in the second embodiment of the present invention, given in reference to FIG. 6.

As shown in FIG. 6, the information processing terminal 200 achieved in this embodiment of the present invention includes GPS signals reception unit 102 and an IC chip 210.

The IC chip 210 is utilized to store data, execute arithmetic processing and exchange data through noncontact communication with an outside device. It is desirable that the IC chip 210 be tamper-proofed so as to prevent information indicating the operation executed in the IC chip or the processing procedure from becoming leaked to an outsider. The IC chip 210 achieved in the second embodiment of the present invention includes a request reception unit 212, a data transmission unit 214, a function selection unit 215, a function decision-making unit 216, a defining information recording unit 118, a data read/write unit 220, a current position measuring unit 122 and a data storage unit 124. The following is a detailed explanation of the internal structure of the IC chip 210.

The request reception unit 212 wirelessly receives a request signal for the IC chip 210 originating from an outside device as does the request reception unit 112 in the first embodiment. The request reception unit 212 in this embodiment, too, receives a function request signal having been transmitted from the IC reader/writer 12 via radio signal with a specific frequency. Once the request reception unit 212 receives the radio signal from the IC reader/writer 12 with the specific frequency, the IC chip 210 is able to respond to the request issued from the outside device.

The data transmission unit 214 wirelessly transmits data to an outside recipient. The data transmission unit 214 in this embodiment transmits data read out by the data read/write unit 220 to the IC reader/writer 12. As the data transmission unit 214 transmits the data to the IC reader/writer 12, noncontact data exchange between the information processing terminal 200 and the IC reader/writer 12 is enabled.

The data read/write unit 220 executes data read/write processing to read/write data from/into the data storage unit 124. The data read/write unit 220 in this embodiment reads/writes data from/into the data storage unit 124 based upon the request signal having originated from the IC reader/writer 220 and having been received at the request reception unit 212. When reading/writing data from/into the data storage unit 124, the data read/write unit 220 executes data read/write processing for the data area having stored therein the data corresponding to a function selected by the function selection unit 215 among a plurality of data areas in the data storage unit 124.

The function selection unit 215 selects the function to be executed at the information processing terminal 200. While a plurality of functions can be executed at the information processing terminal 200 with the built-in IC chip 210 having a plurality of data areas, normally one specific function among the plurality of functions is selected and executed. The function selection unit 215 selects a single function among the plurality of functions based upon the function request transmitted from the outside device.

The function decision-making unit 216 makes a decision as to whether or not the function of the IC chip 210 having been requested by the outside device can be executed. The function decision-making unit 216 takes in via the data read/write unit 220 and the function selection unit 215 the request signal for the IC chip 210, having been received at the request reception unit 212, and executes processing for making a decision as to whether or not the function requested in the request signal can be engaged at the current position of the information processing terminal 100.

By installing the function selection unit 215 between the data read/write unit 220 and the function decision-making unit 216 as in this embodiment, a specific function can be directly selected by the function selection unit 215 and an instruction may be issued for the data read/write unit 220 accordingly. Alternatively, a specific function may be selected by the function selection unit 215 based upon the results of the decision made by the function decision-making unit 216 and an instruction may be issued to the data read/write unit 220 accordingly.

The defining information recording unit 118 contains recorded therein defining information used in the decision-making processing executed by the function decision-making unit 216, as does the defining information recording unit 118 in the first embodiment of the present invention shown in FIG. 2. The function decision-making unit 216 executes the decision-making processing by using the defining information recorded in the defining information recording unit 118. The defining information recorded in the defining information recording unit 118 in this embodiment includes function information and zone information. The function information relates to the functions set in the data storage unit 124 in the IC chip 210, whereas the zone information indicates the engagement ranges over which the functions set in the data storage unit 124 in the IC chip 210 can be engaged. The function information and the zone information are in correspondence to each other.

In this embodiment, the defining information recording unit 118 is included in the IC chip 210, as in the first embodiment. The defining information recording unit 118 according to the present invention may be installed at a location other than within the IC chip 210 at the information processing terminal 200. However, the information recorded in the defining information recording unit 118 relates to the functions of the information processing terminal 200 and, for this reason, the defining information recording unit should be installed at a location where the information therein cannot be altered readily. Accordingly, it is desirable to install the defining information recording unit 118 in the tamper-proofed IC chip 210.

The current position measuring unit 122 measures the current position based upon a GPS signal, as does the current position measuring unit in the first embodiment of the present invention shown in FIG. 2. The current position measuring unit 120 in this embodiment, too, takes in GPS signals having been received at the GPS signal reception unit 102 and measures the current position based upon the GPS signal. It is to be noted that while the current position measuring unit 122 is installed in the IC chip 210 in this embodiment, the present invention is not limited to this example and the current position measuring unit may be installed at a location other than in the IC chip 210 at the information processing terminal 200.

The GPS signal reception unit 102 in FIG. 6 receives GPS signals from the GPS satellites 11a, 11b and 11c, as does the GPS reception unit shown in FIG. 2.

In the data storage unit 124, data related to the functions valid at the information processing terminal 200 are stored, as in the data storage unit in the first embodiment of the present invention shown in FIG. 2. The data storage unit 124 includes a plurality of data areas 126 and 148. Each data area corresponds to a given function, and the data area to be used for read/write is selected based upon the function request originating from the outside device.

It will be obvious that while the data storage unit 124 in this embodiment, too, includes two data areas, each adopting a hierarchical structure therein as does the data storage unit in the first embodiment of the present invention shown in FIG. 2, the quantity of data areas and the internal structure adopted in the data areas are not limited to those shown in the example presented in FIG. 6. The data storage unit 124 may be designed to assume any hierarchical structure.

In this embodiment, too, the data storage unit 124 should be constituted with a storage element capable of electrical data read/write, such as an EPROM (erasable programmable read-only memory) or a FeRAM (ferroelectric random access memory).

The structure adopted in the information processing terminal 200 in the second embodiment of the present invention has been described in reference to FIG. 6. It is to be noted that, in this embodiment, too, the function decision-making processing executed at the processing terminal 200 may be executed by sequentially calling up computer programs stored in the information processing terminal 200.

In the second embodiment of the present invention, too, the functions of the information processing terminal 200 with a built-in IC chip having a plurality of data areas, such as those shown in FIG. 6, enabling the information processing terminal to fulfill a plurality of functions, can be dynamically switched by determining the current position of the information processing terminal 200 by utilizing the GPS, as in the first embodiment of the present invention. In addition, the function settings can be adjusted without having to alter or modify the settings in the IC chip 210, which substantially eliminates the cost that would otherwise be incurred when the settings were altered or modified in the IC chip 210. Since the settings do not need to be altered or modified, better convenience for the user of the information processing terminal 200 is assured.

It should be understood by those skilled in the art that various modifications, combinations, sub-combinations and alterations may occur depending on design requirements and other factors insofar as they are within the scope of the appended claims or the equivalents thereof.

For instance, while the function selection unit 215 selects the function to be executed based upon the function request from the outside device received via the data read/write unit 220 in the second embodiment described above, the present invention is not limited to this example. The function request having been received at the request reception unit 212 may be directly taken into the function selection unit 215 by bypassing the data read/write unit 220, instead.

What is claimed is:

1. An information processing terminal with a built-in IC chip having a plurality of data areas present therein, which engages in wireless data exchange with another device through noncontact communication, comprising a GPS signal reception unit that receives GPS signals originating from a GPS satellite,
the built-in IC chip including:
a request reception unit that wirelessly receives a function request issued to said information processing terminal from the other device, the function request requesting a function of the built-in IC chip, the other device being an IC reader/writer device;
a data transmission unit that wirelessly transmits data from the information processing terminal to the other device;
a current position measuring unit that measures a latitude and a longitude of a current position of said information processing terminal based upon the GPS signals received by said GPS signal reception unit;
a defining information recording unit in which defining information that defines functions that can be engaged at said information processing terminal is recorded;
a function decision-making unit that makes a decision as to whether a function requested by the function request can be engaged based upon said defining information and the latitude and the longitude of the current position measured by said current position measuring unit; and
a data read/write unit that executes data read/write from/into a specific data area among said plurality of data areas based upon results of the decision made by said function decision making unit, and a function selection unit that is connected between the data read/write unit and the function decision-making unit, that selects a specific function of the build-in IC chip based on the decision made by the function decision-making unit, and that issues an instruction to the data read/write unit, wherein the build-in IC chip is configured to switch functions without modifying setting in the build-in IC chip;

wherein the data transmission unit is configured to transmit a message indicating validity of the requested function to the other device, wherein each area of the plurality of data areas corresponds to a function and is excluded from being accessed from another area, each version of a given function being separately allocated to a specific area, and wherein during the wireless data exchange, the specific area is accessed by the function, and data areas other than the specific data area are not accessible by the function, wherein the defining information includes radius information indicating a radius of a circular zone over which certain functions are allowed, a security flag indicating whether the requested function assures secure communication and a write flag indicating whether the requested function enables a valid data write into the plurality of data areas, and wherein the function decision-making unit is configured to make a decision as to whether to engage a function mandating an authentication between the information processing terminal and the other device based upon said defining information, and wherein the defining information further includes origin point information indicating a center of the circular zone.

2. An information processing terminal according to claim 1, wherein: said defining information includes information indicating priority levels; and if a plurality of zones defined by said zone information overlap, said function decision-making unit determines said function to be engaged based upon said priority levels.

3. An information processing terminal according to claim 1, constituted with a portable telephone.

4. A non-transitory storage medium storing a program enabling a computer equipped with a built-in IC chip having a plurality of data areas present therein, which engages in wireless data exchange through noncontact communication, to execute:

a request reception step in which a function request originating from an outside device is wirelessly received, the function request requesting a function of the built-in IC chip;

a data transmission step that wirelessly transmits data from the computer to the outside device, the outside device being an IC reader/writer device;

a GPS signal reception step in which GPS signals from GPS satellites are received;

a current position measuring step in which a latitude and a longitude of a current position are measured based upon the GPS signals received in said GPS signal reception step;

a function decision-making step in which a decision is made as to whether a function requested by the function request can be engaged based upon defining information that defines functions that can be engaged and the latitude and longitude of said current position measured in the current position measuring step; and a data read/write step in which data read/write from/into a given data area among said plurality of data areas is executed based upon results of the decision made in said function decision-making step, and a function selection step that is executed between the data read/write step and the function decision-making step, that selects a specific function of the built-in IC chip based on the decision made by the function decision-making step, and that issues an instruction to the data/read/write step;

wherein the program is configured to switch functions of the built-in IC chip without modifying settings in the built-in IC chip, wherein the data transmission step transmits a message indicating validity of the requested function to the other device, wherein the built-in IC chip is configured to include a request reception unit, a data transmission unit, a current position measuring unit, a defining information recording unit, a function decision-making unit, and a data read/write unit, wherein each area of the plurality of data areas corresponds to a function and is excluded from being accessed from another area, and wherein during the wireless data exchange, the specific area is accessed by the function, and data areas other than the specific data area are not accessible by the function, each version of a given function being separately allocated to a specific area, wherein the defining information includes radius information indicating a radius of a circular zone over which certain functions are allowed, a security flag indicating whether the requested function assures secure communication and a write flag indicating whether the requested function enables a valid data write into the plurality of data areas, and wherein the function decision-making step makes a decision as to whether to engage a function mandating an authentication between the built-in IC chip and the outside device based upon said defining information, and wherein the defining information further includes origin point information indicating a center of the circular zone.

* * * * *